(12) United States Patent
Palacios et al.

(10) Patent No.: US 6,373,938 B1
(45) Date of Patent: Apr. 16, 2002

(54) DEVICE AND METHOD FOR GENERATING A LIST OF QUALIFIED CALL RECIPIENTS

(75) Inventors: Joseph R. Palacios; Robert H. Witzofsky; Gregory P. Pace; Kenneth M. Gianino, all of St. Louis, MO (US)

(73) Assignee: Hanover Communications, Indianapolis, IN (US)

( * ) Notice: Subject to any disclaimer, the term of this patent is extended or adjusted under 35 U.S.C. 154(b) by 0 days.

(21) Appl. No.: 09/069,906

(22) Filed: Apr. 30, 1998

Related U.S. Application Data

(60) Provisional application No. 60/081,804, filed on Apr. 15, 1998.

(51) Int. Cl.[7] .............................................. H04M 3/523

(52) U.S. Cl. ........................... 379/266.02; 379/265.01; 379/266.07; 379/900

(58) Field of Search ................................. 379/214, 216, 379/265, 266, 309, 355, 356, 214.01, 216.01, 265.01, 266.01, 266.02, 266.07, 266.08, 355.01, 356.01, 900

(56) References Cited

U.S. PATENT DOCUMENTS 5,436,965 A * 7/1995 Grossman et al. .......... 379/266

* cited by examiner

Primary Examiner—Harry S. Hong

(57) ABSTRACT

A method of qualifying telephone numbers for use by one or more telephone service representatives consisting of the following steps. Supplying a telephone number database containing telephone numbers and validation criteria to a qualifying computer. Launching calls with the qualifying computer to the telephone numbers in the telephone number database. Selecting called telephone numbers that meet the validation criteria as qualified telephone numbers. Establishing a qualified number queue for containing qualified telephone numbers. Providing access to the qualifying computer by the telephone service representatives to permit them to request qualified telephone numbers from the qualified number queue. Passing at least one qualified telephone number from the qualified number queue to the requesting telephone service representative. Using the requesting telephone service representative to place a call to the qualified telephone numbers passed to the requesting telephone service representative from the qualified number queue.

20 Claims, 2 Drawing Sheets

DEVICE AND METHOD FOR GENERATING A LIST OF QUALIFIED CALL RECIPIENTS

This application claims benefit of Prov. No. 60/081,804 filed Apr. 15, 1998.

I. TECHNICAL FIELD OF THE INVENTION

The present invention relates to a device and method for generating a list of qualified call recipients, and more particularly to a device and method which electronically validates a supplied database of telephone numbers and distributes validated telephone numbers to telephone service representatives.

II. BACKGROUND OF THE INVENTION

Telephones have become a basic method for communicating with people and for gaining entry into a person's domain. Telephones are used in businesses for marketing (telemarketing), verifying customer identity or requirements, distributing warnings or recalls, fund raising and many other purposes. Various tools and methods have been developed to make the use of the telephone more effective for businesses in these areas. Some of these tools and methods have integrated computers with the telephone system to improve the efficiency of telephone service representatives in placing and taking calls.

One of the tools in this area is the predictive dialer which uses a computer to launch more telephone calls than the telephone service representatives can handle because it is expected that a certain percentage of the calls will either be busy, not answer, or will be answered by a machine such as an answering machine, facsimile, computer, pager or other device. The calls that are answered by a human are automatically connected by the call launching computer to an available telephone service representative through a telephone switch. Predictive dialing increases the productivity of the telephone service representatives by not having them spend time calling numbers with no one at home or busy signals. However, there are several problems with predictive dialing including the high cost of a predictive dialing systems, the requirement that telephone service representatives be collated or closely located with the predictive dialing system, and if an telephone service representative is not available when the person answers the predictive dialing system hangs up on the potential customer. For predictive dialing systems to be cost effective there must be a minimum number of telephone service representatives located at the same calling center with the predictive dialing system at the same time. As such, current predictive dialing devices are not cost-effective for use by small (e.g. less than 10) calling centers.

III. SUMMARY OF THE INVENTION

A method of qualifying telephone numbers for use by one or more telephone service representatives consisting of the following steps. Supplying a telephone number database containing telephone numbers and validation criteria to a qualifying computer. Launching calls with the qualifying computer to the telephone numbers in the telephone number database. Selecting called telephone numbers that meet the validation criteria as qualified telephone numbers. Establishing a qualified number queue for containing qualified telephone numbers. Providing access to the qualifying computer by the telephone service representatives to permit them to request qualified telephone numbers from the qualified number queue. Passing at least one qualified telephone number from the qualified number queue to the requesting telephone service representative. Using the requesting telephone service representative to place a call to the qualified telephone numbers passed to the requesting telephone service representative from the qualified number queue.

The method can include the process of maintaining the size of the qualified number queue in a size range based on the number of available requesting telephone service representatives. The size range has an upper limit and a lower limit. The qualifying computer maintains the qualified number queue within the size range by ceasing to launch calls to the telephone numbers in the telephone number database when the number of qualified telephone numbers in the qualified number queue reaches the upper limit of the size range. The qualifying computer resuming to launch calls to the telephone numbers in the telephone number database when the number of qualified telephone numbers in the qualified number queue reaches the lower limit of the size range.

The method can include the step of using the qualifying computer to associate a time stamp with the qualified telephone number indicating the time when the qualified telephone number was selected. This supports the additional step of using the qualifying computer to compare the current time to the time when the qualified telephone number was selected to determine an elapsed time since the qualified telephone number was selected. Then the qualifying computer passes the qualified telephone number from the qualified number queue only if the elapsed time falls within a time range specified in the validation criteria.

The call qualification method can support multiple telephone number databases from a single client, or multiple clients with one or more telephone number databases. The call qualification method also supports one or more telephone service representatives working on one or more telephone number databases. A client manager can control the telephone number database to which a telephone service representative is assigned.

Preferably, the telephone number database and the validation criteria are communicated over the Internet or by other means. The call qualification system waits until one or more telephone service representatives for the client are logged onto the call qualification system locally, remotely, or over the Internet. The call qualification system then begins launching calls to telephone numbers in the client-supplied database. The system analyzes each call to determine the status which could include: busy signal, ringing signal, intercept signal, no answer, modem, fax machine, answering machine, or human. The qualified telephone numbers that meet the client-specified validation criteria, are placed in a qualified call queue for communication to logged-on telephone service representatives. The telephone numbers that are not validated are flagged as to their status and placed back in the telephone number database to be retried. Telephone service representatives logged into the call qualification system request qualified telephone numbers individually or in groups from the call qualification system.

One advantage of the call qualification system and method is that it automatically pre-validates the telephone numbers according to a client selected validation criteria before they are sent to the telephone service representatives. This greatly reduces the time spent by the telephone service representatives in unproductive activities, such as encountering unwanted telephone status, such as a busy signal or no answer. The result is an increase in the productivity of the telephone service representatives.

Another advantage of the call qualification system is its ability to provide coordinated support to a plurality of telephone service representatives who are distributed at a plurality of locations remote from the qualifying computer. Use of remote logons and the Internet allows the source of the client database, the call qualification system and each of the telephone service representatives to be at different, distributed locations. Each telephone service representative location with computer or Internet access can retrieve telephone numbers from the qualified call queue. This eliminates the need for centralized phone banks at which multiple telephone service representatives must be co-located to have access to validated telephone numbers. This allows telephone service representatives to work from home or other convenient location, eliminating travel time and costs for the telephone service representative and the cost of dedicated phone banks for the client.

Still another advantage of the call qualification system is its ability to support many clients simultaneously. Without the need for co-located telephone service representatives and dedicated telephone lines, the call qualification system can be monitoring and filling the qualified call queues for several clients at the same time without affecting the activities of the telephone service representatives. This allows the call qualification system to work closer to full capacity without demanding that all the capacity come from just one or a small number of clients.

Yet another advantage of the call qualification system and method is added time flexibility. Telephone service representatives can log into the call qualification system at their convenience from any location with a telephone and direct or Internet access to the call qualification system because unlike a predictive dialing system that requires a telephone representative to be present to receive a call being handed off by the predictive dialer, the present invention permits a call to be made over a wider range of times.

Also, when compared to known predictive dialing systems, the call qualification system of the present invention is more cost effective when used with smaller groups of telephone service representatives working for a single client due to its ability to service many clients simultaneously. The flexibility in calling location, time schedule, and servicing of multiple clients enables persons to serve efficiently as telephone service representatives using the call qualification system, who might not otherwise be able to work as telephone service representatives or otherwise to participate effectively.

Additional features and advantages of the invention are set forth in the description that follows, and will become apparent to those skilled in the art upon reviewing the drawings in connection with the following description.

IV. BRIEF DESCRIPTION OF THE DRAWINGS

V. DETAILED DESCRIPTION OF THE PREFERRED EMBODIMENT

Figure 1:
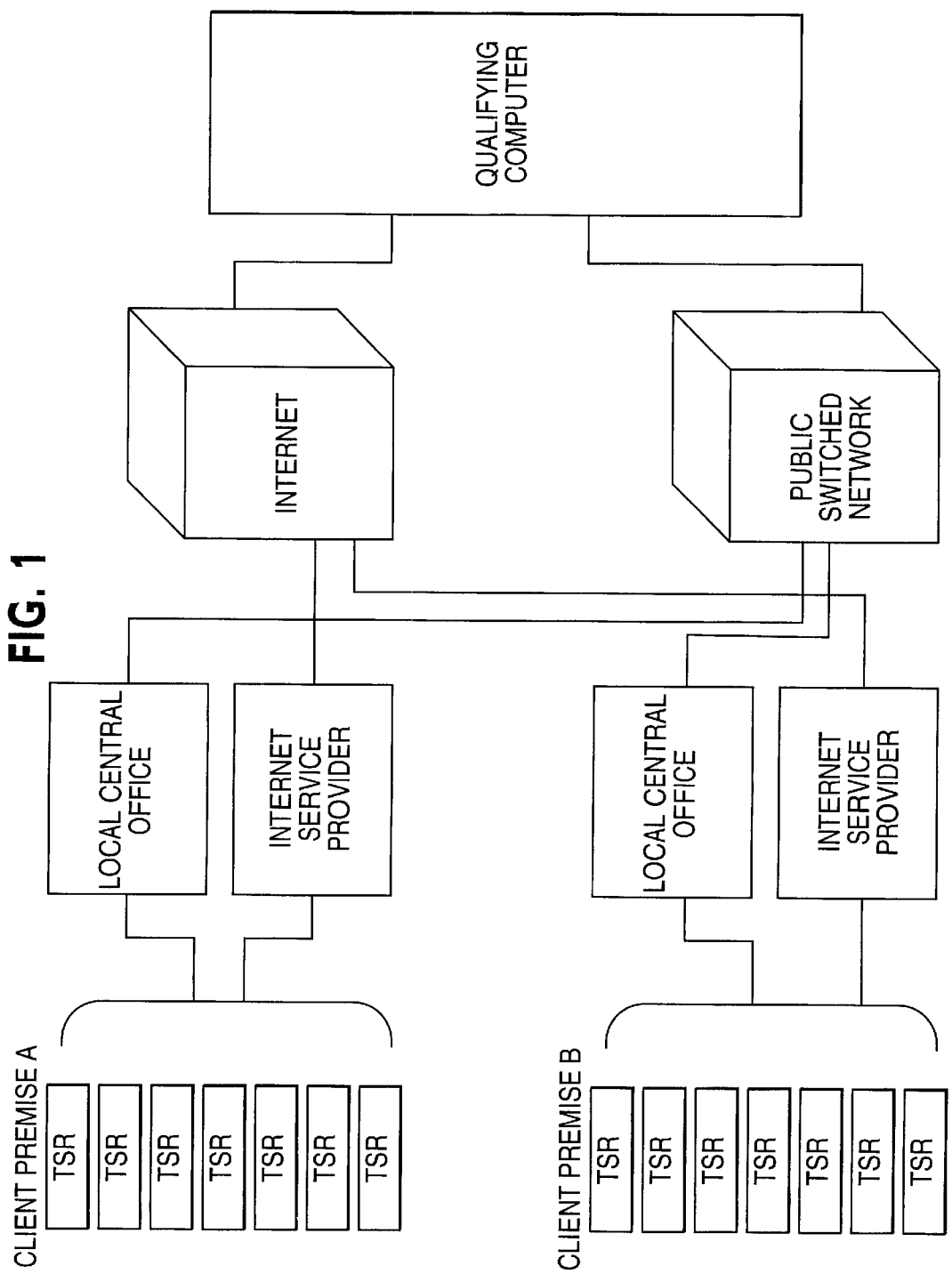
FIG. 1 is a diagram of the data connections of the call qualification system for a single client.

Turning now to FIG. 1, the interconnections used in the call qualification system 10 are shown. Telephone service representatives 12 are each connected to a local telephone central office 22 and an Internet service provider 32. The Internet service provider 32 provides the telephone service representatives 12 with access to the Internet 34. The local telephone central office 22 provides the telephone service representatives 12 with access to a public switched telephone network 24. A qualifying computer 42, which contains the software for the call qualification system 10, is also connected to the Internet 34 and the public switched telephone network 24. The qualifying computer 42 stores a client supplied telephone number database 102 and validation criteria 104 and during operation populates a qualified number queue 106.

The telephone service representatives 12 can be located at the same location using the same local telephone central office 22 and single or multiple Internet service providers 32. Alternatively, the telephone service representatives 12 can be distributed at various locations using single or multiple local telephone central offices 22 and single or multiple Internet service providers 32. The only requirement is that each telephone service representative 12 has access to both a local telephone central office 22 and an Internet service provider 32. This embodiment shows telephone service representative 12 gaining access to the qualifying computer 42 through the Internet 34, however this access could be provided by any other computer communication method, e.g. modem, local area network and other methods.

A client for whom the telephone service representatives 12 are making calls would have previously supplied the telephone number database 102 and the validation criteria 104. If the client fails to provide validation criteria 104 or provides only partial validation criteria, then the missing values can be supplied by the call qualification system. The telephone number database 102 can be supplied with additional client data for each telephone number including: customer identifier, name, address, age, previous purchases, previous donations, or any other information that the client considers relevant to the customer telephone number and wants the telephone service representative 12 to be made aware of when making the call. This additional data would remain associated with the telephone number and when a qualified telephone number is passed to a telephone service representative 12 from the qualified number queue 106 this information would also be passed the telephone service representative 12. The validation criteria 104, supplied by the client, includes the status required for a telephone number before it is transferred to the qualified number queue 106 to be made available to the telephone service representatives 12. Typically, the validation criteria 104 supplied by the client will instruct that the telephone number be answered by a human being.

The qualifying computer 42 can determine many telephone statuses, including: busy signal, ringing signal, intercept signal, no answer, modem, fax machine, answering machine, or human. In order to determine the statuses, the qualifying computer 42 has [PROCEDURES OR ELECTRONICS?] which test the signal being produced by the called telephone number (e.g. busy signal, human voice) to determine whether the signal produced meets the client's desired validation criteria (e.g. a human voice) or is otherwise an undesired signal (e.g. a busy signal). In order to determine the difference between these types of signals, the applicant's have found that digital signal processing boards D/240SC-T1 and D/480SC-2T1, which are commercially available from Dialogic Corporation, 515 Route Ten, Parsippany, New Jersey, work well.

The qualified number queue 106 stores telephone numbers from the telephone number database 102 that have met the status of the validation criteria 104 and are ready to be passed to telephone service representatives 12 as qualified telephone numbers.

The flow of information through the call qualification system 10 shown in FIG. 1 would be as follows. A client supplies the telephone number database 102 and the client-desired validation criteria 104 prior to the telephone service representatives 12 logging onto the call qualification system 10. The qualifying computer 42 can be notified that telephone service representatives 12 will be logging on at a particular time and to have the qualified number queue 106 ready. Alternatively, the populating of the qualified number queue 106 can begin when the telephone service representatives 12 begin logging on. The qualifying computer 42 computes a desired size range for the qualified number queue 106 based on the number of active telephone service representatives 12, and preferably the average call duration being experienced. The function relating qualified number queue 106 size to number of active telephone service representatives 12 can be supplied by the client as part of the validation criteria 104 or computed by a default function resident on the qualifying computer 42. The size of the qualified number queue (and hence the average residence time of a qualified telephone number on the qualified number queue) is managed to keep qualified numbers from becoming stale, having their status change, between validation by the qualifying computer 42 and a call being placed by the telephone service representative 12.

The qualifying computer 42 launches calls through the public switched telephone network 24 to the numbers in the telephone number database 102. The qualifying computer 42 determines the status of the telephone number and takes the appropriate action. The client, as part of the validation criteria 104, can specify the action it wants the qualifying computer 42 to take for each status detected. For example, if a human answers the client desired validation criteria can specify that the computer hang up, and then transfer the number to the qualified number queue 106 as a qualified number to be called by a telephone service representative 12. Alternatively, if a busy signal or fax machine is encountered the client-desired validation criteria 104 can specify that the particular number be maintained in the telephone number database 102 for later retry. Similarly, if an answering machine is encountered, the telephone number can be returned to the telephone number database 102 for later retry, or as an alternative, the client supplied validation criteria 104 can specify that a message be left on the answering machine and the particular number can be flagged as one wherein a message was left, although no known contact was made, so that if the call is not returned, the number can be retried at a later time. Further, if a number is no longer in use, then it can be flagged as inoperative and not retried.

The action to be taken for each status can be specified by the client or a default action will be taken. The telephone number is flagged as to its status and acted upon according to the instructions in the validation criteria 104; if appropriate the telephone number is transferred to the qualified number queue 106. When the qualified number queue 106 reaches the upper limit of the desired size range, the qualifying computer 42 ceases to launch calls to additional numbers in the telephone number database 102. The qualifying computer 42 will resume launching calls to numbers in the telephone number database 102 when the qualified number queue 106 reaches the lower limit of the desired size range.

The telephone service representatives 12 logs onto the qualifying computer 42 through an Internet service provider 32 and the Internet 34 The qualifying computer 42 verifies the telephone service representative's user identification and security information and the client for whom the telephone service representative 12 is to make calls.

After successfully logging on, the telephone service representative 12 requests one or more qualified telephone numbers from the qualified number queue 106. The number of qualified telephone numbers that can be passed from the qualified number queue 106 to the telephone service representatives 12 at one time can be specified by the client as part of the validation criteria 104. The qualifying computer 42 passes telephone numbers from the qualified number queue 106 along with any associated data over the Internet 34 to the requesting telephone service representative 12. The telephone service representative 12 will make calls to the received qualified numbers through the local telephone central office 22 and the public switched telephone network 24. When the telephone service representative 12 has acted upon all of the received qualified numbers then the telephone service representative 12 will request more qualified numbers from the qualified number queue 106 on the qualifying computer 42 through the Internet service provider 32 and the Internet 34. The qualifying computer 42 tracks the number of telephone service representatives 12 calling for the client, and the telephone service representatives 12 inform the system when they plan to stop calling or take breaks, so that the qualifying computer 42 can determine the desired range for the number of telephone numbers to have in the qualified number queue 106.

The qualifying computer 42 maintains a client report which lists the status of each telephone number in the telephone number database 102 and the action taken for that telephone number. A client manager 44 can view the client report either locally or remotely while the qualifying computer 42 and telephone service representatives 12 are actively processing the associated telephone number database 102 or the client manager 44 can view the report after processing has ceased on the associated telephone number database 102. The client manager 44 can communicate with the qualifying computer 42 through the Internet, modem, local area network or other computer-to-computer communication technique. FIG. 1 shows the client manager 44 connected to the qualifying computer through the Internet service provider 32 and Internet 34.

The client manager 44 can update the validation criteria 104 or override a telephone number status in the telephone number database 102. If a particular client has more than one telephone number database 102, each having an associated validation criteria 104 and qualified number queue 106, the client manager 44 can reassign one or more telephone service representatives 12 currently working on one telephone number database to another telephone number database. The reassignment of the telephone service representative 12 will take place at the telephone service representative's next request of qualified telephone numbers from the qualified number queue 106. The qualifying computer 42 will also send client supplied information to the reassigned telephone service representative 12 informing the telephone service representative 12 of the reassignment and the appropriate actions to be taken for the new numbers from the new qualified number queue 106.

Figure 2:
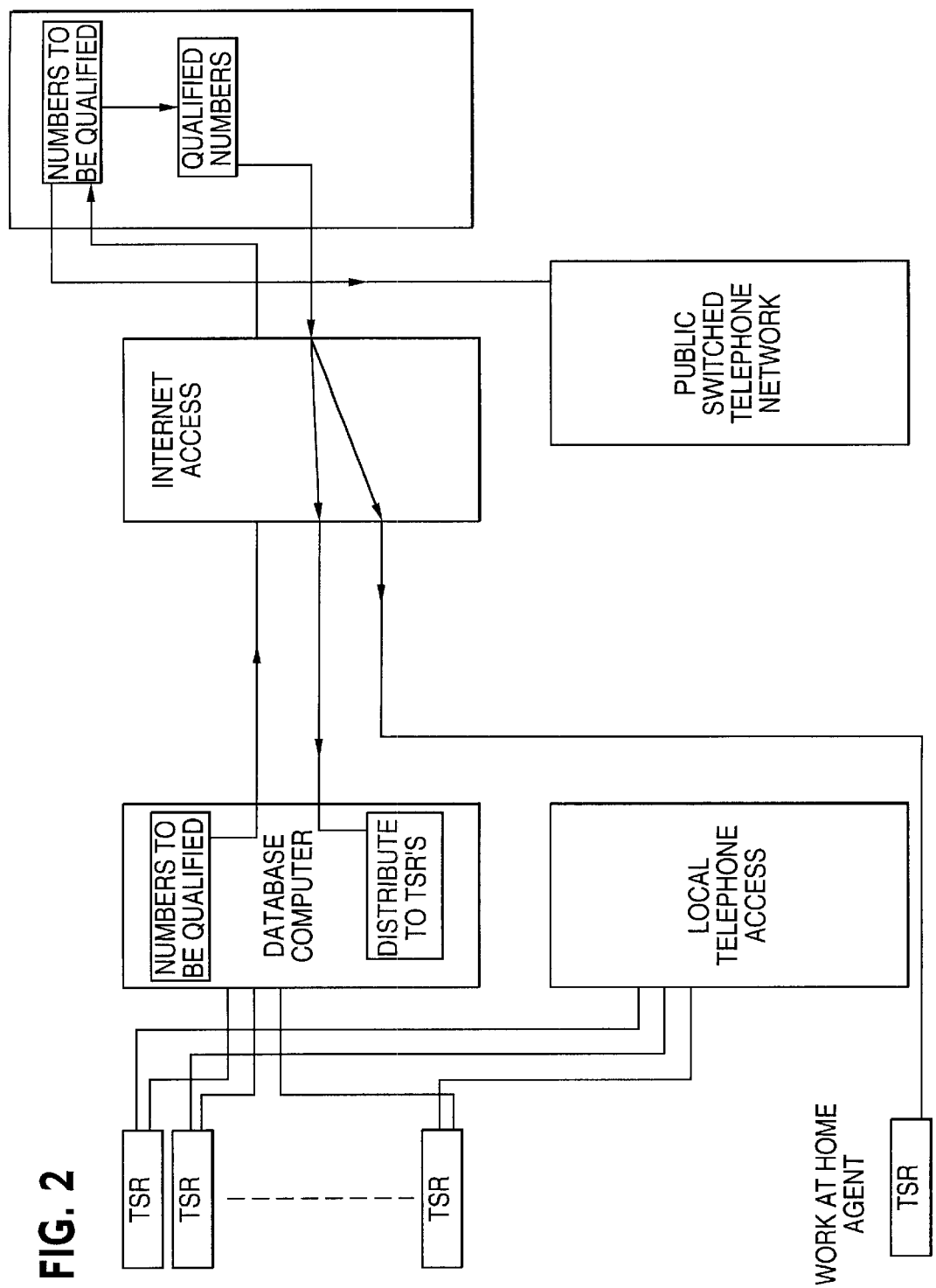
FIG. 2 is a diagram of the data connections of the call qualification system for two clients.

FIG. 2 shows the call qualification system to support multiple clients. Client A has multiple telephone service representatives 12 either co-located or dispersed, each of client A's telephone service representatives 12 having access to a local telephone central office 22 and an Internet service provider 32. Client B also has multiple telephone service representatives 12' either co-located or dispersed. Each of client B's telephone service representatives 12' also have access to a local telephone central office 22 and an Internet service provider 32. The local telephone central offices 22 and the Internet service providers 32 can be the same or different for each of the telephone service representatives 12, 12' of clients A and B. The flow of data is the same as described in FIG. 1 except that the qualifying computer 42 independently stores and processes a client telephone number database 102, 102' and client validation criteria 104, 104' for each of client A and client B, respectively. During operation the qualifying computer 42 will populate the client A qualified number database 106 with telephone numbers from the client A telephone number database 102 according to the parameters in the client A validation criteria 104. Additionally, the qualifying computer 42 will independently populate the client B qualified number database 106 with telephone numbers from the client B telephone number database 102 according to the parameters in the client B validation criteria 104. Client A has a client manager 44 and client B has a client manager 44'. Each client can have one or more telephone number databases 102 and for each telephone number database there will be an associated validation criteria 104 and a qualified number queue 106.

The validation criteria 104 can also include a time window specifying a minimum and maximum elapsed time between when a telephone number in the qualified number queue 106 was validated and when it is passed to a telephone service representative 12. The minimum elapsed time parameter prevents the telephone service representative 12 from calling a telephone number too soon after the qualifying computer 42 made the validation call, to reduce the likelihood that the call recipient will associate the telephone service representative's call with the qualifying computer validation call. The maximum elapsed time parameter prevents the telephone service representative 12 from calling telephone numbers too long after the qualifying computer 42 made the validation call. As will be appreciated, the passage of an extended time between a qualifying (validation call and a telephone service representative's call) increases the probability that the status of the telephone number has changed to an unwanted status. Before the qualifying computer 42 passes a telephone number from the qualified number queue 106 to a requesting telephone service representative 12, it will compare a time stamp placed on the qualified telephone number when it was validated against the current time to calculate the elapsed time. If the elapsed time since validation falls within the allowable time window then the number from the qualified numbers queue 106 will be passed to the requesting telephone service representative 12. Otherwise, the telephone number will lose its "qualified" status and will be removed from the qualified numbers queue 106 and be returned to the telephone number database 102. When so returned, the particular number can be re-validated if so desired.

It will be understood that various modifications can be made to the apparatus disclosed in this application without changing the scope of the invention.

What is claimed is:

1. A method of qualifying telephone numbers for use by at least one telephone service representative, comprising:

supplying a telephone number database containing telephone numbers and validation criteria to a qualifying computer;

launching calls with the qualifying computer to the telephone numbers in the telephone number database;

selecting called telephone numbers that meet the validation criteria as qualified telephone numbers;

establishing a qualified number queue for the qualified telephone numbers;

providing access to the qualifying computer by the at least one telephone service representative to permit the at least one telephone service representative to request at least one of the qualified telephone numbers from the qualified number queue;

passing at least one qualified telephone number from the qualified number queue to a requesting telephone service representative; and using the requesting telephone service representative to place a call to the at least one qualified telephone number passed to the requesting telephone service representative from the qualified number queue.

2. The method of claim 1 wherein the step of providing access to the qualifying computer by the at least one telephone service representative includes the step of providing Internet access to the qualifying computer.

3. The method of claim 1 wherein the step of establishing a qualified number queue includes the steps of maintaining the size of the qualified number queue in a size range based on the number of available requesting telephone service representatives; the size range having an upper limit and a lower limit; wherein the qualifying computer maintains the qualified number queue within the size range by ceasing to launch calls to the telephone numbers in the telephone number database when the number of qualified telephone numbers in the qualified number queue reaches the upper limit of the size range and the qualifying computer resuming to launch calls to the telephone numbers in the telephone number database when the number of qualified telephone numbers in the qualified number queue reaches the lower limit of the size range.

4. The method of claim 1 wherein the step of selecting called telephone numbers that meet the validation criteria as qualified telephone numbers includes the step of using the qualifying computer to associate a time stamp with the qualified telephone number indicating the time when the qualified telephone number was selected.

5. The method of claim 4 wherein the step of passing at least one qualified telephone number from the qualified number queue to the requesting telephone service representative includes the step of using the qualifying computer to compare the current time to the time when the at least one qualified telephone number was selected to determine an elapsed time since the at least one qualified telephone number was selected, and using the qualifying computer to pass the at least one qualified telephone number from the qualified number queue only if the elapsed time falls within a time range specified in the validation criteria.

6. A method of qualifying telephone numbers from at least a first and second telephone number database for use by at least a first and second telephone service representative, the first telephone service representative being assigned to the first telephone number database, and the second telephone service representative being assigned to the second telephone number database, the method comprising the steps of:

(a) supplying first and second validation criteria for the first and second telephone number databases, respectively, to a qualifying computer;

(b) launching calls with the qualifying computer to telephone numbers in each of the first and second telephone number databases;

(c) selecting called telephone numbers from the first telephone number database that meet the first validation criteria as being qualified telephone numbers and selecting called telephone numbers from the second telephone number database that meet the second validation criteria as being qualified telephone numbers;

(d) establishing a first qualified number queue for containing the qualified telephone numbers from the first telephone number database, and establishing a second qualified number queue for containing the qualified telephone numbers from the second telephone number database;

(e) transferring qualified telephone numbers from the first telephone number database to the first qualified number queue, and transferring qualified telephone numbers from the second telephone number database to the second qualified number queue;

(f) providing access to the qualifying computer by the first and second telephone service representatives to permit the first telephone service representative to request qualified telephone numbers from the first qualified number queue, and to permit the second telephone service representative to request qualified telephone numbers from the second qualified number queue;

(g) passing at least one qualified telephone number from the first qualified number queue to the first telephone service representative, and at least one qualified telephone number from the second qualified number queue to the second telephone service representative; and (h) using the requesting first telephone service representative to place a call to the at least one qualified telephone number passed from the first qualified number queue, and the requesting second telephone service representative to place a call to the at least one qualified telephone number passed from the second qualified number queue.

7. The method of claim 6 wherein the step of providing access to the qualifying computer by the first and second telephone service representatives includes the step of providing Internet access to the qualifying computer.

8. The method of claim 6 wherein the step of establishing a first qualified number queue and a second qualified number queue includes the steps of maintaining the size of the first qualified number queue in a first size range based on the number of requesting first telephone service representatives assigned to the first telephone number database and maintaining the size of the second qualified number queue in a second size range based on the number of requesting second telephone service representatives assigned to the second telephone number database; the first size range having a first upper limit and a first lower limit; the second size range having a second upper limit and a second lower limit; wherein the qualifying computer maintains the first qualified number queue within the first size range by ceasing to launch calls to the telephone numbers in the first telephone number database when the number of qualified telephone numbers in the first qualified number queue reaches the first upper limit and the qualifying computer resuming to launch calls to the telephone numbers in the first telephone number database when the number of qualified telephone numbers in the first qualified number queue reaches the first lower limit; and the qualifying computer maintains the second qualified number queue within the second size range by ceasing to launch calls to the telephone numbers in the second telephone number database when the number of qualified telephone numbers in the second qualified number queue reaches the second upper limit and the qualifying computer resuming to launch calls to the telephone numbers in the second telephone number database when the number of qualified telephone numbers in the second qualified number queue reaches the second lower limit.

9. The method of claim 6 wherein the step of selecting called telephone numbers as qualified telephone numbers includes the step of using the qualifying computer to associate a time stamp with the qualified telephone number indicating the time when the status of the qualified telephone number was determined.

10. The method of claim 9 wherein the step of passing at least one qualified telephone number from the first qualified number queue to the requesting first telephone service representative includes the step of using the qualifying computer to compare the current time to the time the at least one qualified telephone number was selected to determine an elapsed time since the status of the at least one qualified telephone number in the first qualified number queue was determined, and using the qualifying computer to pass the at least one qualified telephone number from the first qualified number queue only if the elapsed time falls within a time range specified in the validation criteria.

11. The method of claim 6 further comprising the step of reassigning telephone service representatives between the first and second telephone number databases.

12. A method of qualifying telephone numbers for a plurality of clients, wherein each client has at least one telephone number database and at least one telephone service representative, each telephone service representative being assigned to one of the at least one telephone number databases, the method comprising the steps of:

(a) supplying validation criteria for each telephone number database to a qualifying computer;

(b) launching calls with the qualifying computer to telephone numbers in each of the telephone number databases;

(c) selecting called telephone numbers from each telephone number database that meet the corresponding validation criteria as being qualified telephone numbers;

(d) establishing a qualified number queue for each telephone number database for containing the qualified telephone numbers from that particular telephone number database;

(e) transferring qualified telephone numbers from each telephone number database to the corresponding qualified number queue;

(f) providing access to the qualifying computer by each of the telephone service representatives to permit the telephone service representative to request qualified telephone numbers from the qualified number queue corresponding to the telephone number database to which the telephone service representative is assigned;

(g) passing at least one qualified telephone number to the telephone service representative from the qualified number queue corresponding to the telephone number database to which the telephone service representative is assigned; and (h) using the requesting telephone service representative to place a call to the at least one qualified telephone number passed from the qualified number queue corresponding to the telephone number database to which the telephone service representative is assigned.

13. The method of claim 12 wherein the step of providing access to the qualifying computer by each of the telephone service representatives includes the step of providing Internet access to the qualifying computer.

14. The method of claim 12 wherein the step of establishing a qualified number queue for each telephone number database includes the steps of maintaining the size of each particular qualified number queue in a size range based on the number of available requesting telephone service representatives assigned to the telephone number database to which the particular qualified number queue corresponds; each size range having an upper limit and a lower limit; wherein the qualifying computer maintains the particular qualified number queue within the size range by ceasing to launch calls to the telephone numbers in the telephone number database when the number of qualified telephone numbers in the particular qualified number queue reaches the upper limit of the size range and the qualifying computer resuming to launch calls to the telephone numbers in the telephone number database when the number of qualified telephone numbers in the particular qualified number queue reaches the lower limit of the size range.

15. The method of claim 12 wherein the step of selecting called telephone numbers from each telephone number database as being qualified telephone numbers includes the step of using the qualifying computer to associate a time stamp with the qualified telephone number indicating the time when the status of the qualified telephone number was determined.

16. The method of claim 15 wherein the step of passing at least one qualified telephone number to the telephone service representative from the qualified number queue corresponding to the telephone number database to which the telephone service representative is assigned includes the step of using the qualifying computer to compare the current time to the time the at least one qualified telephone number was selected to determine an elapsed time since the status of the at least one qualified telephone number was determined, and using the qualifying computer to pass the at least one qualified telephone number only if the elapsed time falls within a time range specified in the validation criteria corresponding to the telephone number database to which the telephone service representative is assigned.

17. The method of claim 12 further comprising the step of reassigning telephone service representatives between telephone number databases.

18. A call qualification system for use by at least one telephone service representative having access to a telephone line and access to a remote computer, the call qualification system comprising:
 a qualifying computer with access to a telephone network and accessible remotely by the remote computer, the qualifying computer including:
  (a) a call launcher for launching a call to each of a multitude of telephone numbers contained in a telephone number database,
  (b) a call selector for selecting called telephone numbers that meet predetermined validation criteria to be qualified telephone numbers,
  (c) a qualified number queue for establishing and storing a multitude of qualified telephone numbers,
  (d) a call transferor for transferring qualified telephone numbers to the qualified number queue,
  (e) a communication device for:
   (1) providing access to the qualifying computer by the at least one telephone service representative to permit the at least one telephone service representative to request qualified telephone numbers from the qualified number queue, and
   (2) passing at least one qualified telephone number from the qualified number queue to the requesting telephone service representative so that the requesting telephone service representative can call the at least one qualified telephone number.

19. The call qualification system of claim 18 wherein the qualifying computer includes a status maintenance means for maintaining status records of the status of the telephone numbers.

20. The call qualification system of claim 19 wherein the communication device includes a client manager access connection for permitting a client manager to have has access to the qualifying computer, so that the client manager can review the status records and update the validation criteria.

* * * * *